United States Patent
Haugsjaahabink

(10) Patent No.: US 10,590,859 B2
(45) Date of Patent: Mar. 17, 2020

(54) FUEL CONTROL SYSTEM

(71) Applicant: Hamilton Sundstrand Corporation, Charlotte, NC (US)

(72) Inventor: Todd Haugsjaahabink, Springfield, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 561 days.

(21) Appl. No.: 14/965,265

(22) Filed: Dec. 10, 2015

(65) Prior Publication Data
US 2017/0167390 A1  Jun. 15, 2017

(51) Int. Cl.
| | |
|---|---|
| *F02C 9/28* | (2006.01) |
| *F02C 9/26* | (2006.01) |
| *F02C 7/232* | (2006.01) |
| *B64D 37/00* | (2006.01) |
| *F02C 9/46* | (2006.01) |
| *F02C 9/52* | (2006.01) |
| *F16K 11/06* | (2006.01) |

(52) U.S. Cl.
CPC ............... *F02C 9/28* (2013.01); *B64D 37/00* (2013.01); *F02C 7/232* (2013.01); *F02C 9/263* (2013.01); *F02C 9/46* (2013.01); *F02C 9/52* (2013.01); *F16K 11/06* (2013.01); *F05D 2220/323* (2013.01); *F05D 2260/606* (2013.01)

(58) Field of Classification Search
CPC .... F02C 9/263; F02C 9/28; F02C 9/46; F02C 9/52; F02C 7/232; F02C 7/236; F05D 2220/323; F05D 2260/606; F16K 11/06; F02M 57/025; F02M 47/027; F02M 59/466; F02M 59/366; F02M 63/004
See application file for complete search history.

(56) References Cited

U.S. PATENT DOCUMENTS

| | | | | |
|---|---|---|---|---|
| 3,672,163 A | * | 6/1972 | White | F02C 7/26 60/39.281 |
| 4,449,359 A | * | 5/1984 | Cole | F02C 7/22 60/39.094 |
| 4,493,187 A | * | 1/1985 | Hansen | F02C 7/232 60/39.281 |
| 6,401,446 B1 | * | 6/2002 | Gibbons | F02C 9/38 60/39.281 |
| 8,919,094 B2 | * | 12/2014 | Haugsjaahabink | F02C 7/22 60/39.281 |
| 9,428,278 B2 | * | 8/2016 | Goguet-Chapuis | B64D 37/04 |

(Continued)

FOREIGN PATENT DOCUMENTS

WO  0201055 A1  1/2002

OTHER PUBLICATIONS

European Search Report for EP Application No. 16203306.2 dated Apr. 12, 2017.

*Primary Examiner* — Carl C Staubach
(74) *Attorney, Agent, or Firm* — Cantor Colburn LLP

(57) ABSTRACT

A bypass valve for a fuel control includes a sleeve, a spool, and a biasing member. The sleeve has a body extending between a first end and a second. The first end defines a first bypass valve port. The body defines a second bypass valve port, a third bypass valve port, and a shutoff port. The second end defines a fourth bypass valve port. The spool is received within the inner bore and is movable between a first position and a second position. The biasing member biases the spool toward the first position.

4 Claims, 3 Drawing Sheets

(56) References Cited

U.S. PATENT DOCUMENTS

| | | | |
|---|---|---|---|
| 2005/0279079 A1 | 12/2005 | Baryshnikov et al. | |
| 2012/0045348 A1* | 2/2012 | Garry | F04B 23/06 |
| | | | 417/302 |
| 2013/0276918 A1* | 10/2013 | Haugsjaahabink | F02C 7/22 |
| | | | 137/516.27 |
| 2014/0311599 A1* | 10/2014 | Haugsjaahabink | F02D 1/02 |
| | | | 137/565.11 |
| 2016/0305338 A1* | 10/2016 | Chapski | F01D 21/02 |
| 2017/0292451 A1* | 10/2017 | Reuter | F02C 7/236 |

* cited by examiner

FUEL CONTROL SYSTEM

BACKGROUND OF THE INVENTION

The present invention relates to a fuel control system for supplying fuel to an aircraft engine.

An aircraft engine includes a fuel delivery system with control valves that regulate or limit fuel delivery to a combustion section of the aircraft engine. At least one control valve of the fuel delivery system is actuated to reduce fuel delivery to the combustion section of aircraft engine in response to an overspeed protection shutdown request. Ultimately, the control valves cease delivery of fuel to the combustion section of the aircraft engine. However, the response time of the control valves may be longer than desirable.

SUMMARY OF THE INVENTION

In an embodiment of the present invention, a fuel control system is provided. The fuel control system includes a shutoff valve and a bypass valve. The shutoff valve has a first shutoff valve port, a second shutoff valve port, and a third shutoff valve port. The first shutoff valve port is fluidly connected to a metering valve outlet. The second shutoff valve port is fluidly connected to an engine. The third shutoff valve port is fluidly connected to a damping orifice. The bypass valve has a first bypass valve port, a second bypass valve port, a third bypass valve port, a fourth bypass valve port, and a shutoff port. The first bypass port is fluidly connected to the metering valve outlet. The second bypass valve port is fluidly connected to a fuel pump inlet. The third bypass valve port is fluidly connected to a fuel pump outlet. The fourth bypass valve port is selectively fluidly connected to the fuel pump inlet and the fuel pump outlet and to the third shutoff valve port. The shutoff port is fluidly connected to the third shutoff valve port. The bypass valve moves from a closed position toward an open position in response to an actuator fluidly connecting the fourth bypass valve port to the fuel pump inlet.

In another embodiment of the present invention, a bypass valve for a fuel control system is provided. The bypass valve includes a sleeve, a spool, and a biasing member. The sleeve has a body defining an inner bore. The body extends between a first end and a second end disposed opposite the first end. The first end defines a first bypass valve port. The body defines a second bypass valve port, a third bypass valve port, and a shutoff port. The second end defines a fourth bypass valve port. The spool is slidably received within the inner bore of the sleeve. The spool is movable between a first position and a second position. The biasing member is disposed within the inner bore and engages the underside of the spool and the second end. The biasing member biases the spool toward the first position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
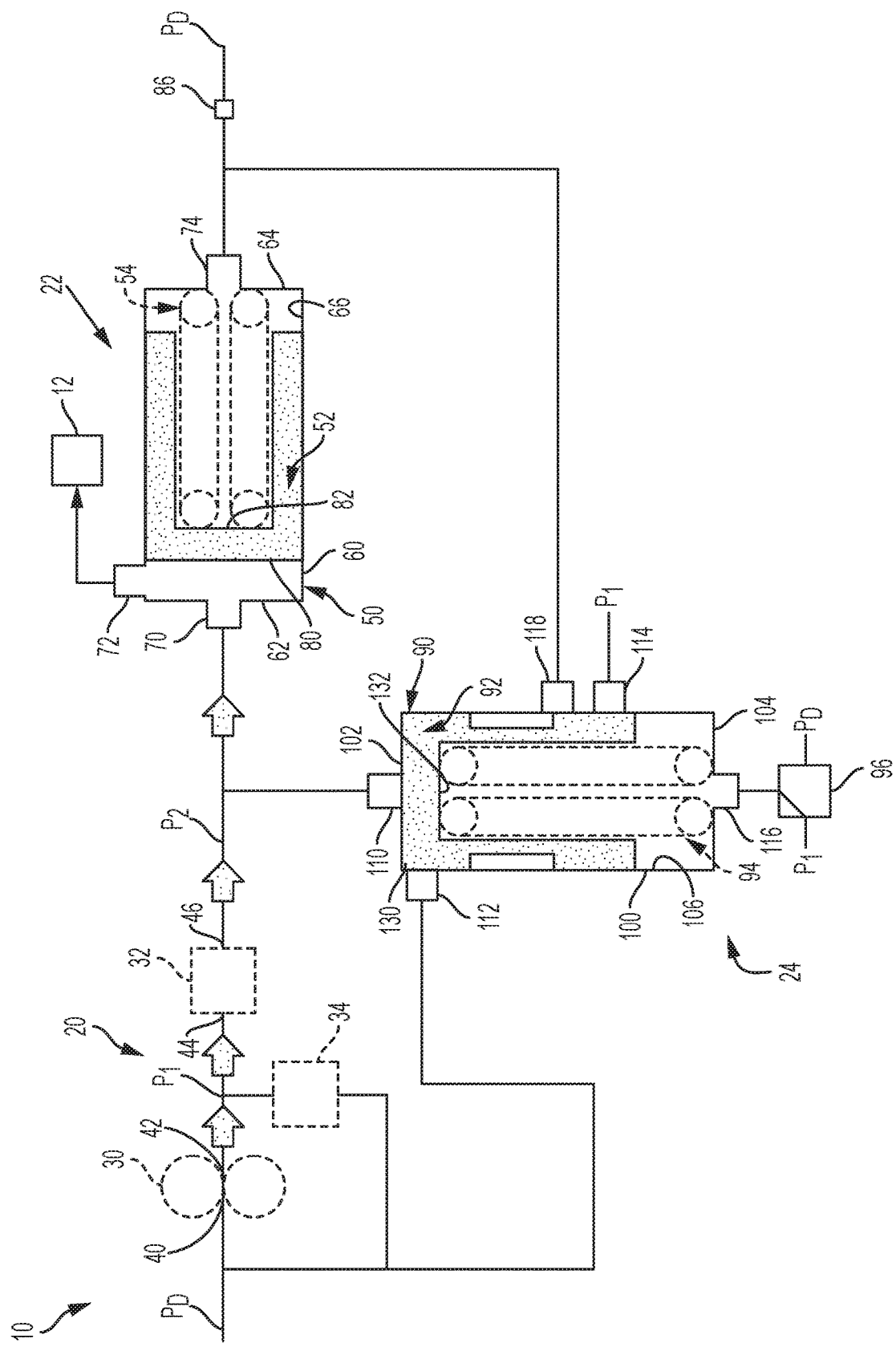
FIG. 1 is a schematic diagram of a fuel control system of an aircraft prior to receiving an overspeed shutdown request.

Referring to FIG. 1 a schematic diagram of a fuel control system 10 of an aircraft is shown. The fuel control system 10 regulates fuel that is delivered to an aircraft engine 12. The fuel control system 10 includes a fuel delivery arrangement 20, a shutoff valve 22, and a bypass valve 24.

The fuel delivery arrangement 20 includes a fuel pump 30, a metering valve 32, and a pressure regulating valve 34. The fuel pump 30 is fluidly connected to a fuel tank or fuel storage system. The fuel pump 30 includes a fuel pump inlet 40 and a fuel pump outlet 42. The fuel pump inlet 40 receives fuel from the fuel tank at a drain pressure, PD. The fuel pump 30 supplies fuel through the fuel pump outlet 42 to the metering valve 32 at a first supply pressure, P1. The first supply pressure, P1, is greater than the drain pressure, PD.

The metering valve 32 is fluidly connected to the fuel pump 30. The metering valve 32 is actuated or modulated to increase or decrease the flow of fuel from the fuel pump that is delivered to the shutoff valve 22 and ultimately to the aircraft engine 12. The metering valve 32 includes a metering valve inlet 44 and a metering valve outlet 46. The metering valve inlet 44 is fluidly connected to the fuel pump outlet 42. The metering valve outlet 46 is selectively fluidly connected to the shutoff valve 22 and the bypass valve 24. The metering valve 32 supplies fuel through the metering valve outlet 46 to the shutoff valve 22 at a second supply pressure, P2. The second supply pressure, P2, is greater than the drain pressure, PD. The first supply pressure, P1, is greater than the second supply pressure, P2.

Fuel that passes through the metering valve 32 is controlled or regulated by the pressure regulating valve 34. Fuel that is not supplied to the metering valve 32 is routed through the pressure regulating valve 34 and back to the fuel pump 30. The pressure regulating valve 34 enables fuel pressure discharged from the fuel pump outlet 42 to be returned to the fuel pump inlet 40 via a bypass line.

Prior to the fuel control system 10 receiving an overspeed shutdown request the metering valve 32 is fluidly connected to the shutoff valve 22. The shutoff valve 22 is configured to permit or inhibit fuel flow to the aircraft engine 12. The shutoff valve 22 inhibits fuel flow to the aircraft engine 12 when a fuel pressure (second supply pressure, P2) delivered to the shutoff valve 22 falls below a threshold fuel pressure.

The shutoff valve 22 includes a shutoff valve sleeve 50, a shutoff valve spool 52, and a shutoff valve biasing member

54. The shutoff valve sleeve 50 includes a sleeve body 60 extending between a sleeve first end 62 and a sleeve second end 64. The sleeve first end 62 is disposed opposite the sleeve second end 64. The sleeve body 60 defines a sleeve inner bore 66.

The shutoff valve sleeve 50 defines a plurality of ports or windows to fluidly connect the shutoff valve 22 with various components of the fuel control system 10. The shutoff valve sleeve 50 defines a first shutoff valve port 70, a second shutoff valve port 72, and a third shutoff valve port 74.

The first shutoff valve port 70 is defined by or extends through the sleeve first end 62. The first shutoff valve port 70 is fluidly connected to the metering valve outlet 46. The first shutoff valve port 70 receives fuel pressure discharged from the metering valve outlet 46 (second supply pressure, P2) that fills a cavity defined by the sleeve first end 62, the shutoff valve spool 52, and the sleeve inner bore 66 when the shutoff valve spool 52 is in a first position or open position.

The second shutoff valve port 72 is defined by or extends through the sleeve body 60. The second shutoff valve port 72 is disposed proximate but is spaced apart from the sleeve first end 62. The second shutoff valve port 72 is fluidly connected to the aircraft engine 12. The second shutoff valve port 72 enables the fuel pressure discharged from the metering valve outlet 46 (second supply pressure, P2) that fills the cavity defined by the sleeve first end 62, the shutoff valve spool 52, and the sleeve inner bore 66 to be supplied to the aircraft engine 12 when the shutoff valve spool 52 is in the first position or open position.

The third shutoff valve port 74 is defined by or extends through the sleeve second end 64. The third shutoff valve port 74 is fluidly connected to a damping orifice 86. The damping orifice 86 stabilizes the shutoff valve spool 52 and ultimately the shutoff valve 22 during fuel delivery operation. The damping orifice 86 is open to the fuel pump inlet 40 or is open to the drain pressure, PD. The drain pressure, PD, fills a cavity defined by the shutoff valve spool 52, the sleeve inner bore 66, and the sleeve second end 64.

The shutoff valve spool 52 is slidably received within the sleeve inner bore 66. The shutoff valve spool 52 is axially movable along a length of the sleeve body 60. The shutoff valve spool 52 includes a top side 80 and an underside 82 disposed opposite the top side 80. The top side 80 faces toward the sleeve first end 62.

The shutoff valve biasing member 54 is disposed within the sleeve inner bore 66. The shutoff valve biasing member 54 engages the underside 82 of the shutoff valve spool 52 and the sleeve second end 64. The shutoff valve biasing member 54 biases the shutoff valve spool 52 toward a second position or a closed position. During fuel delivery operation, while an aircraft engine overspeed condition is not present, the force of the second supply pressure, P2, applied to the top side 80 of the shutoff valve spool 52 overcomes an opposing force applied by the drain pressure, PD, and a biasing force of the shutoff valve biasing member 54 to the underside 82 of the shutoff valve spool to maintain or hold the shutoff valve spool 52 in the first position or open position; such that the shutoff valve 22 permits fuel to be supplied to the aircraft engine 12.

The bypass valve 24 is referred to as a windmill bypass valve that communicates fuel away from the shutoff valve 22 during an aircraft engine shutdown procedure. The bypass valve 24 inhibits fuel from entering the bypass valve 24, prior to the fuel control system 10 receiving an overspeed shutdown request or an engine shutdown request.

The bypass valve 24 includes a bypass valve sleeve 90, a bypass valve spool 92, and a bypass valve biasing member 94. In at least one embodiment, an actuator 96 is provided and disposed proximate the bypass valve 24. The bypass valve sleeve 90 includes a body 100 extending between a first end 102 and a second end 104. The first end 102 is disposed opposite the second end 104. The body 100 defines an inner bore 106.

The bypass valve sleeve 90 defines a plurality of ports or windows to fluidly connect the bypass valve 24 with various components of the fuel control system 10. The bypass valve sleeve 90 defines a first bypass valve port 110, a second bypass valve port 112, a third bypass valve port 114, a fourth bypass valve port 116, and a shutoff port 118.

The first bypass valve port 110 is defined by or extends through the first end 102. The first bypass valve port 110 is fluidly connected to the metering valve outlet 46. The first bypass valve port 110 receives at least a portion of the fuel pressure discharged from the metering valve outlet 46 that fills a cavity defined by the first end 102, the bypass valve spool 92, and the inner bore 106 while the bypass valve spool 92 is in a second position or open position.

The second bypass valve port 112 is defined by or extends through the body 100. The second bypass valve port 112 is disposed proximate but is spaced apart from the first end 102. The second bypass valve port 112 is fluidly connected to the fuel pump inlet 40. The second bypass valve port 112 enables the fuel pressure discharged from the metering valve outlet 46, metering valve outlet pressure or second supply pressure, P2, that fills the cavity defined by the first end 102, the bypass valve spool 92, and the inner bore 106 to be returned to the fuel pump inlet 40 or the fuel tank when the bypass valve spool 92 is in a second position or open position.

The third bypass valve port 114 is defined by or extends through the body 100. The third bypass valve port 114 is fluidly connected to the fuel pump outlet 42. The third bypass valve port 114 is open to the fuel pump outlet 42 or is open to the fuel pump outlet first supply pressure, P1.

The fourth bypass valve port 116 is defined by or extends through the second end 104. The fourth bypass valve port 116 is selectively connected to the fuel pump outlet 42 and the fuel pump inlet 40. The fourth bypass valve port 116 is open to the fuel pump outlet 42 or is open to the fuel pump outlet first supply pressure, P1. The fuel pump outlet first supply pressure, P1, fills a cavity defined by the bypass valve spool 92, the inner bore 106, and the second end 104 to bias the bypass valve spool 92 toward a first position or closed position when an overspeed shutdown request is not provided to the bypass valve 24. The fourth bypass valve port 116 is open to the fuel pump inlet 40 or is open to the fuel pump inlet pressure or drain pressure, PD. The drain pressure, PD, fills the cavity defined by the bypass valve spool 92, the inner bore 106, and the second end 104 to enable the bypass valve spool 92 to move toward the second position or open position.

The shutoff port 118 is defined by or extends through the body 100. The shutoff port 118 is disposed proximate the third bypass valve port 114. The shutoff port 118 is fluidly connected to the third shutoff valve port 74 and the damping orifice 86. In at least one embodiment, the shutoff port 118 is fluidly connected to an intersection node that is disposed between the third shutoff valve port 74 and the damping orifice 86.

The shutoff port 118 has a shutoff port diameter that is greater than a damping orifice diameter. In at least one embodiment, the shutoff port 118 is sized to be larger than the damping orifice 86.

The bypass valve spool 92 is slidably received within the inner bore 106. The bypass valve spool 92 is axially movable along the length of the body 100. The bypass valve spool 92 includes a top surface 130 and an undersurface 132 disposed opposite the top surface 130. The top surface 130 faces toward the first end 102.

The bypass valve biasing member 94 is disposed within the inner bore 106. The bypass valve biasing member engages the undersurface 132 of the bypass valve spool 92 and the second end 104. The bypass valve biasing member 94 biases the bypass valve spool 92 toward a first position or a closed position. During fuel delivery operation, while an aircraft engine overspeed condition is not present, the force of the first supply pressure, P1, applied to the undersurface 132 of the bypass valve spool 92 and the force of the bypass valve biasing member 94 aids in maintaining or holding the bypass valve spool 92 in the first position or closed position.

The actuator 96 is disposed proximate the body 100 of the bypass valve 24. The actuator 96 is configured to operate the bypass valve 24 as a servo valve such that the bypass valve 24 is selectively fluidly connected to various components within the fuel control system 10.

The actuator 96 is configured to selectively fluidly connect the fourth bypass valve port 116 to the fuel pump outlet 42 or the fuel pump outlet first supply pressure, P1, and the fuel pump inlet 40 or the fuel pump inlet pressure/drain pressure, PD. During normal operation of the fuel control system 10, when an overspeed shutdown request is not sent, the fourth bypass valve port 116 is fluidly connected to the fuel pump outlet 42 or the fuel pump outlet first supply pressure, P1. The combination of the fuel pump outlet first supply pressure, P1, and the bypass valve biasing member 94 inhibits the movement of the bypass valve spool 92 away from the first position or closed position. The bypass valve spool 92 in the first position or closed position inhibits fuel flow through the bypass valve 24. Fuel flow is inhibited from flowing through the first bypass valve port 110, the second bypass valve port 112, the third bypass valve port 114, and the shutoff port 118.

Figure 2:
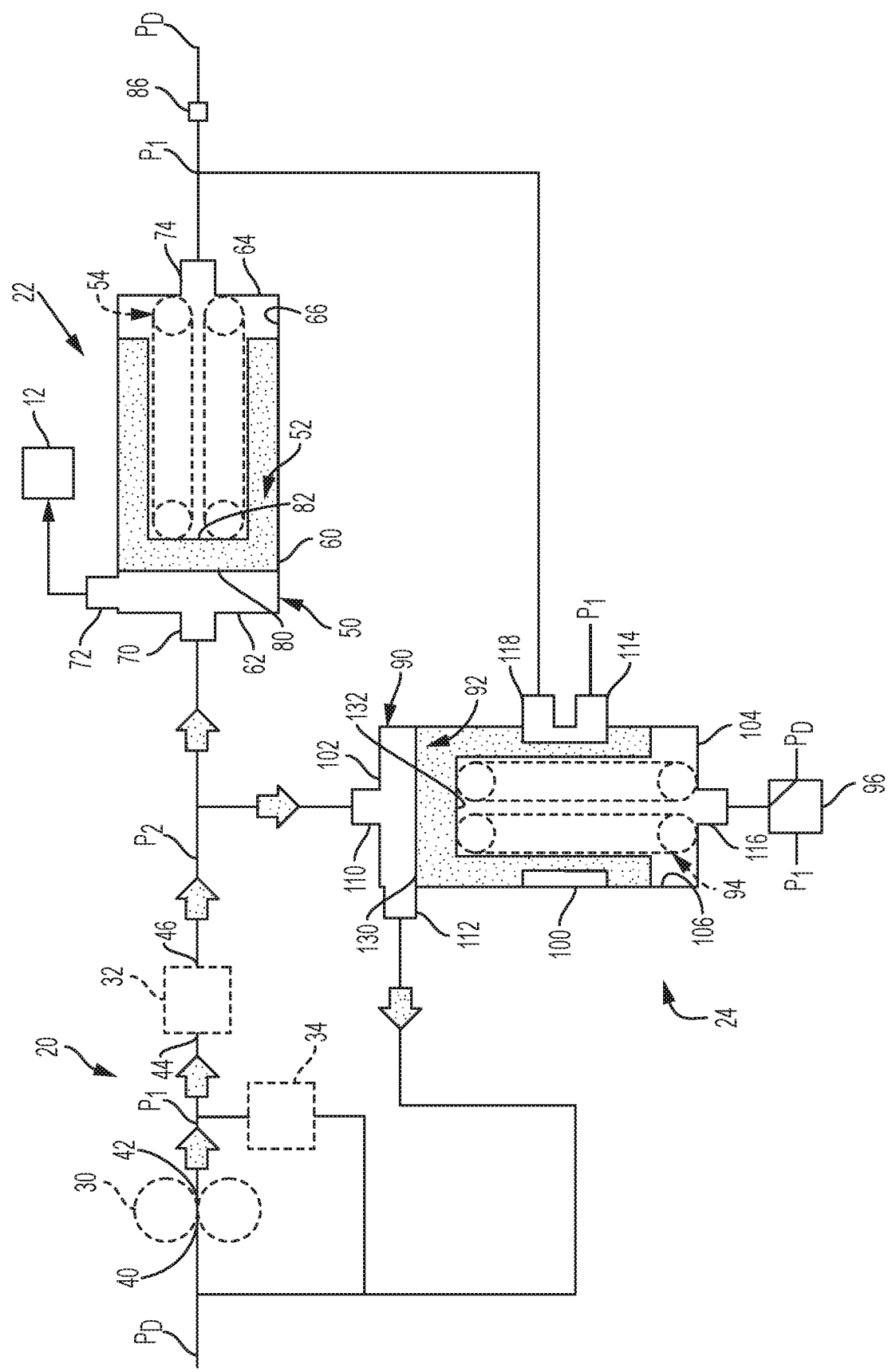
FIG. 2 is a schematic diagram of the fuel control system of the aircraft after receiving the overspeed shutdown request prior to the completion of fuel shutoff.

As shown in FIG. 2, in response to an engine shutdown request provided by an electronic engine control module or a full authority digital controller to the actuator 96 based on a potential aircraft engine overspeed condition, the actuator 96 connects the fourth bypass valve port 116 to the fuel pump inlet or the fuel pump inlet pressure/drain pressure, PD. The reduction of the pressure applied to the undersurface 132 due to the change from the fuel pump outlet first supply pressure, P1 to the fuel pump inlet pressure/drain pressure, PD enables the bypass valve spool 92 to move away from the first position or closed position toward the second position or open position.

The actuator 96 is configured to connect the forth bypass valve port 116 to drain pressure, PD. This allows P2 to overcome the force of the bypass valve biasing member 94 to push the bypass valve to the second position or open position. Such that, in response to the detection of a potential aircraft engine overspeed condition the actuator 96 moves the bypass valve spool 92 from the first position or closed position toward the second position or open position.

The movement of the bypass valve spool 92 away from the first position or closed position enables fuel flow through the bypass valve 24. In response to the bypass valve spool 92 moving from the first position or closed position toward the second position or open position, fuel flow is enabled to flow through the first bypass valve port 110 and the second bypass valve port 112. The enablement of fuel flow through the first bypass valve port 110 and the second bypass valve port 112 reduces an amount of fuel delivered or reduces the second supply pressure, P2, provided to the shutoff valve 22 and ultimately to the aircraft engine 12. As the fuel pressure (second supply pressure, P2) delivered to the shutoff valve 22 approaches a threshold fuel pressure, the shutoff valve spool 52 of the shutoff valve 22 begins to close the shutoff valve 22.

Figure 3:
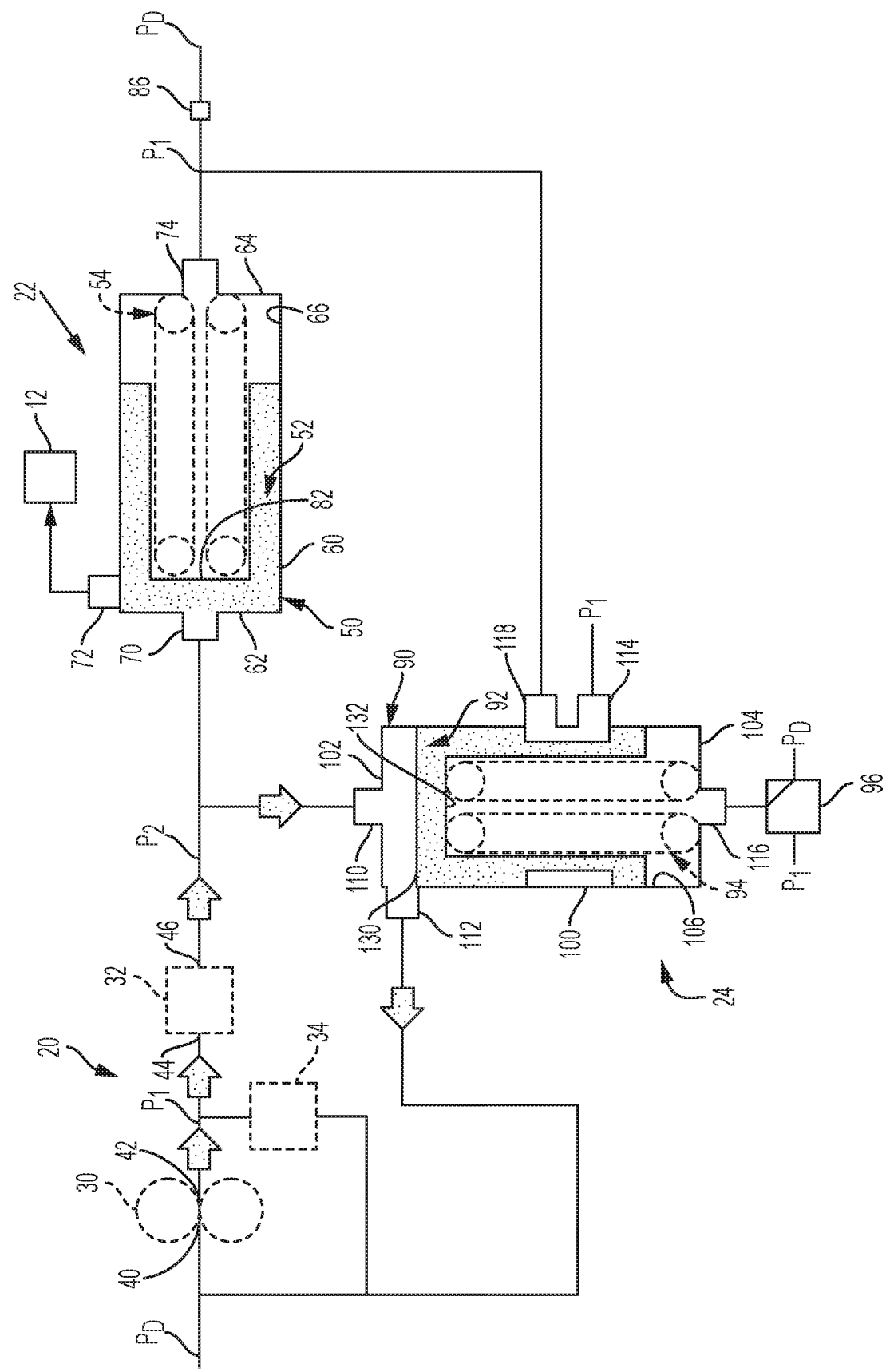
FIG. 3 is a schematic diagram of the fuel control system of the aircraft after receiving overspeed shutdown request and at completion of fuel shutoff.

The movement of the bypass valve spool 92 away from the first position or the closed position at least partially opens the shutoff port 118. As shown in FIG. 3, the at least partial opening of the shutoff port 118 fluidly connects the shutoff port 118 to the third shutoff valve port 74 and the damping orifice 86. In response to the fluid connection between the shutoff port 118 and the third shutoff valve port 74, the third shutoff valve port 74 is fluidly connected to the fuel pump outlet 42 or is open to the fuel pump outlet first supply pressure, P1. The fuel pump outlet first supply pressure, P1, fills the cavity defined by the shutoff valve spool 52, the sleeve inner bore 66, and the sleeve second end 64. The combination of the fuel pump outlet first supply pressure, P1, and the shutoff valve biasing member 54 urges or encourages the shutoff valve spool 52 away from the first position or open position toward the second position or closed position. The additional urging of the shutoff valve spool 52 toward the second position or closed position enables the shutoff valve 22 to close more quickly.

The opening of the bypass valve 24 results in the closing of the shutoff valve 22 to inhibit fuel delivery to the aircraft engine 12. More specifically, the sizing of the shutoff port 118 to be larger than the damping orifice 86 encourages the shutoff valve 22 to close more quickly or at a faster rate than a closing rate of the shutoff valve 22 under the reduction in the second supply pressure, P2, delivered to the shutoff valve 22 less than the threshold fuel pressure to maintain the shutoff valve 22 in the open position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A bypass valve for a fuel control system, the bypass valve comprising:
   a sleeve having a body having a sleeve inner bore to define a cylindrical portion with opposing ends including a first end and a second end that axially opposes the first end,
   the body including a plurality of ports, including:
   a first bypass valve port that fluidly connects to the sleeve inner bore through the first end, wherein the first bypass valve port is fluidly connected to receive fluid from a metering valve, the metering valve being fluidly connected to a fuel pump outlet of a fuel pump,
   a second bypass valve port that fluidly connects to the sleeve inner bore through the cylindrical portion proximate the first end, the second bypass valve port being is fluidly connected to discharge fluid to a fuel pump inlet for the fuel pump,
   a third bypass valve port that fluidly connects to the sleeve inner bore through the cylindrical portion intermediate the plurality of ends, the third bypass valve port being fluidly connected to the fuel pump outlet, and
a fourth bypass valve port that fluidly connects to the sleeve inner bore, wherein the fourth bypass valve port is fluidly connected to an actuator switch that switches between a first state and a second state, and
a fifth bypass valve port that fluidly connects to the sleeve inner bore through the cylindrical portion intermediate the first end and the third bypass valve port, the fifth bypass valve port being a shutoff port, and
a spool slidably disposed within the sleeve inner bore, the spool including a spool body having a spool inner bore to define a spool cylindrical portion, the spool cylindrical portion including opposing spool ends including a first spool end and a second spool end that opposes the first spool end, wherein the first spool end is closed, and wherein the first spool end faces the first end of the sleeve and the second spool end faces the second end of the sleeve, the spool movable between:
  a first position wherein the first spool end is axially against the first end of the sleeve, whereby the sleeve inner bore is fluidly isolated from each of the first bypass valve port, the second bypass valve port, the third bypass valve port and the fifth bypass valve port; and
  a second position wherein the first spool end is axially spaced from the first end of the sleeve body, whereby a plurality of fluid connections are effected in the sleeve inner bore, the plurality of fluid connections including a first fluid connection that connects the first bypass valve port and the second bypass valve port and a second fluid connection that connects the third bypass valve port and the fifth bypass valve port, wherein the first fluid connection is fluidly isolated from the second fluid connection, wherein:
  when the actuator is in the first state, the spool is in or transitions to the first position, and
  when the actuator is in the second state, the spool is in or transitions to the second position; and
a biasing member disposed within the sleeve inner bore and extending between the first spool end and the second end of the sleeve, the biasing member biases the spool toward the first position.

2. The bypass valve of claim 1, wherein the fourth bypass valve port fluidly connects to the sleeve inner bore through the second end.

3. The bypass valve of claim 2, wherein the shutoff port is fluidly connected to a damping orifice.

4. The bypass valve of claim 3, wherein the fourth bypass valve port is selectively fluidly connected to the fuel pump inlet and the fuel pump outlet.

* * * * *